United States Patent [19]
Weiss

[11] Patent Number: 4,636,358
[45] Date of Patent: Jan. 13, 1987

[54] CONCRETIZATION OF HIGH LEVEL RADIOACTIVE SOURCE IN MARINE SEDIMENT

[75] Inventor: Herbert V. Weiss, San Diego, Calif.

[73] Assignee: The United States of America as represented by the Secretary of the Navy, Washington, D.C.

[21] Appl. No.: 698,199

[22] Filed: Feb. 4, 1985

[51] Int. Cl.[4] ............................................. C23F 15/00
[52] U.S. Cl. ........................................ 422/6; 114/257; 250/506.1
[58] Field of Search ............... 422/6, 159; 114/257; 252/629, 633; 250/506.1; 427/5, 6; 428/2

[56] References Cited

U.S. PATENT DOCUMENTS

| | | | |
|---|---|---|---|
| 3,230,373 | 1/1966 | Montgomery | 250/506.1 X |
| 3,659,108 | 4/1972 | Quase | 252/633 X |
| 3,760,753 | 9/1973 | Mertens | 252/633 X |
| 3,983,050 | 9/1976 | Mecham | 252/663 X |
| 4,192,629 | 3/1980 | Hallenius et al. | 405/128 |
| 4,307,679 | 12/1981 | Goldsberry et al. | 114/257 |
| 4,315,831 | 2/1982 | Morin et al. | 252/628 |
| 4,376,792 | 3/1983 | Angelini et al. | 427/5 X |
| 4,377,509 | 3/1983 | Haynes et al. | 252/633 |
| 4,400,314 | 8/1983 | Ellis et al. | 252/633 |
| 4,428,700 | 1/1984 | Lennemann | 405/128 |
| 4,430,256 | 2/1984 | Rustum | 252/628 |
| 4,435,290 | 3/1984 | Lindörfer et al. | 210/721 X |
| 4,532,428 | 7/1985 | Dyck et al. | 252/633 X |

FOREIGN PATENT DOCUMENTS

| | | | |
|---|---|---|---|
| 0174799 | 10/1984 | Japan | 252/633 |
| 2138198 | 3/1984 | United Kingdom | 252/633 |

OTHER PUBLICATIONS

"The Condensed Chemical Dictionary, 10th Edition", Gessnor G. Hawley (ed.), Van Nostrand Reinhold Co., pp. 71 and 187, 1981.

Primary Examiner—Barry S. Richman
Assistant Examiner—B. P. Heaney
Attorney, Agent, or Firm—Robert F. Beers; Ervin F. Johnston; John Stan

[57] ABSTRACT

A concretized coating which encapsulates canisters of radioactive, heat-producing materials is caused to be formed by immersing said canister in a sea floor sedimentary layer, the sediment containing feldspathic material. The canister heats the surrounding water causing alkali and alkaline materials to be leached from the seabed sediment. An indurated concretized layer of anhydrite and sedimentary particles is then formed by precipitation of anhydrite and other agents from the hot pore water, that is, water in the proximate environment of the canister. This concretized barrier provides protection to the fuel capsule against intrusion by the corrosive seawater.

1 Claim, 2 Drawing Figures

CONCRETIZATION OF HIGH LEVEL RADIOACTIVE SOURCE IN MARINE SEDIMENT

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Disposal of radioactive waste is a critical problem. Disposal of radioactive materials in the deep-sea bed has been studied for many years. A key advantage of deep-sea bed disposal over land disposal is the emplacement of the waste into a sediment or clay that has strong absorptive capacity for the radioactive elements likely to be released from the waste form over thousands of years.

A program has been underway for studying the possible utilization of stable, nonproductive deep ocean floor areas as repositories for high level nuclear wastes. The program is based upon a multiple barrier concept and considers a solidified waste in the form of glass contained within a canister which in turn is separated from the water column by burial in the sediment.

Sediments heated over 200 degrees C. are known to affect glasses adversely. It is further regarded that under these hot conditions the canister may be breached prematurely thereby resulting in release of radioactivity into the sediments. Thus, the above scheme considers emplacement at lower temperatures by either aging or decreasing the amount of radionuclides in the canister. However, important advantage would be gained if conditions existed that vitiated this requirement.

The invention presented herein provides a means for creating a natural barrier through the heat generated by high levels of radioactivity. The barrier formed thereby provides protection to radioactive source containment against the corrosive effects of the marine environment.

SUMMARY OF THE INVENTION

This invention results from the discovery that a layer of indurated concretized material is formed about a radio isotopic thermal electrical generator fuel capsule when placed in a coastal marine sediment environment. Heat produced by the radioactive decay of a $^{238}$Pu fuel source contained within an iridium clad capsule resulted in the development of a concretized layer when the source was emplaced in a coastal marine environment containing feldspathic sediment. The fuel capsule was initially coated with nearly pure anhydrite. As the concretion increased in size, sedimentary particles were incorporated into the cementing agent. This barrier provided protection to the fuel capsule against intrusion by the corrosive pore water, that is, water from the proximate environment, within the pores of the marine sediment, and thereby inhibited leakage of the radioactive material into the surrounding environment.

OBJECTS OF THE INVENTION

An object of the invention is to provide a concretized coating which encapsulates canisters which contain heat producing materials and protects against the leakage of such materials from the canisters into the surrounding ocean environment when said canisters are stored or deposited into the sediment of the ocean floor.

A second object of the invention is to provide a method for protectively storing heat producing or radioactive materials contained in canisters which become encapsulated by a concretized coating of anhydrite and sedimentary particles when said canisters are deposited in the sediment on the ocean floor.

These and other objects of the invention will become more readily apparent from the ensuing specification when taken together with the drawings.

DESCRIPTION OF THE PREFERRED EMBODIMENT

Studies of nuclear waste systems (e.g. waste form such as borosilicate glass, canister material and design, and repository characteristics and design) seem to consider all interactions between waste and the surroundings as being detrimental to achieving adequate isolation of the waste from the biosphere. The subject matter of this invention suggests that the interaction might be beneficial, under some circumstances, in establishing and maintaining waste isolation. This invention addresses the creation of a protective coating which is formed in-situ from substances at hand within the ocean environment, and the minimization of the likelihood of adverse interaction of the coating with the surrounding environment as would be expected to occur to an uncoated metallic canister. Further, damage to the outermost layers of the concretized coating appears to be self-repairing.

A radioactive isotopic thermal electric generator (RTG) fueled with $^{238}$Pu was studied in its interaction with the ocean environment, more particularly with the sedimentary bottom or sea floor. Of particular interest was the result of the formation of an indurated concretion 10 upon submergence of the fuel capsule, or canister 12 in a coastal marine sediment and the resulting protection against the corrosive action of pore water.

Figure 1:
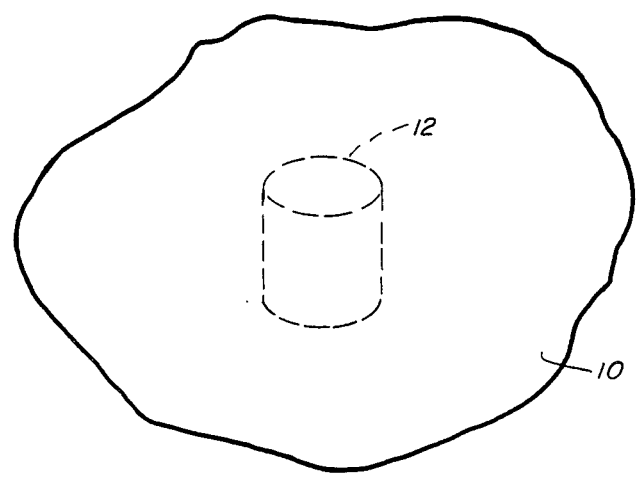
FIG. 1 is a general perspective of the concretized mass and the canister containing the heat producing or radioactive material.
Figure 2:
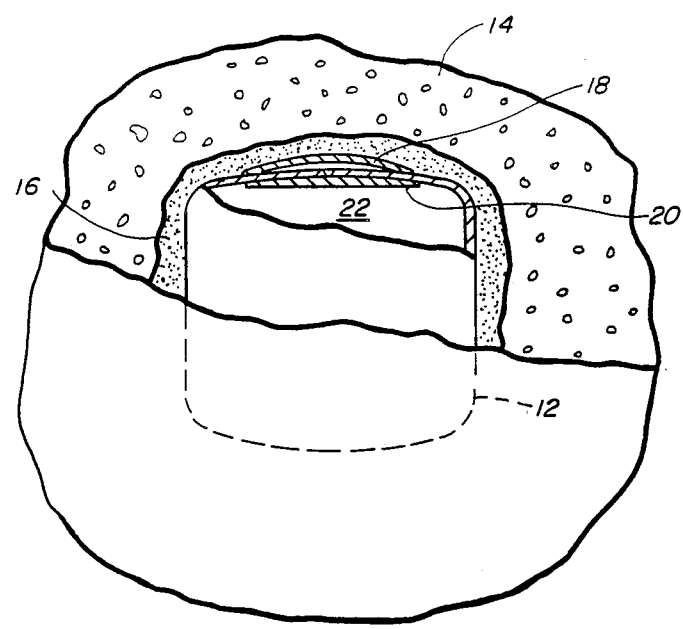
FIG. 2 is a cross-sectional view showing the canister of the heat producing or radioactive material surrounded by the concretized anhydrite and sedimentary particles.

The preferred embodiment of the invention (shown in FIGS. 1 and 2) results from studies made upon this radioactive source of $^{238}$PuO$_2$, 22, contained within an iridium-clad 12 canister. The heat produced by the radioactive decay of the $^{238}$PuO$_2$ source caused development of a concretion layer 10 upon emplacement of the source in a coastal marine environment containing feldspathic sediment. The concretized coating forming on the fuel capsule was initially nearly pure anhydrite (i.e. CaSO$_4$) 16. As the concretion increased in size, sedimentary particles were also incorporated by this cementing agent 14. This barrier provided protection to the fuel capsule against intrusion by the corrosive pore water.

The $^{238}$PuO$_2$ was a cylindrically-shaped 62.5-W (thermal) solid ceramic pellet with average-diameter and length of 2.75 centimeters. This fuel element 22 fits within an Ir-clad canister 12. The final dimensions of the canister were 2.99 centimeters diameter by 3.01 centimeters height. One end of the capsule is equipped with a sintered Ir disc 20 and a vent cover 18. The vent cover is pierced to permit the release of He formed in the radioactive decay process. The sintered disc is intended to prevent loss of the Pu into the environment.

During field tests, a capsule was transferred to an exposure chamber which consisted of a steel container 0.6 meters in diameter, 15 centimeters deep, and filled to within 5 centimeters of the top with local sand-size sediment. The container was weighted on the bottom by a 15 centimeter thick circular slab of concrete. The open top was secured by a removable conical, preforated metal canopy. A similar container without a heat source served as a control unit. The chambers were placed on the ocean floor at a depth of 25 meters at about 500 meters off shore.

At monthly intervals for the first three months and every three months thereafter, the chambers were removed from their location and examined. Upon retrieval the fuel capsule was immediately immersed in seawater to prevent a rise in temperature. Subsequently the fuel capsule was inspected, photographed, reemplaced in the sediment in approximately the same position, and returned to the sea floor. Sixteen months after the initial emplacement the capsule was removed from the marine environment and transferred to a plastic-lined 55-gal drum that contained a 20 centimeter thick layer of San Clemente Island sediment. The heat source was embedded in the sediment and covered with about 100 liters of seawater.

Two months later the capsule was transferred to a seawater-filled container in preparation for shipment. Thereafter, the temperature rapidly stabilized at 52° C. The fuel capsule resided in this environment for five and one half months and then was removed for post-exposure destructive analysis.

The initial placement of the hot fuel capsule at the seawater-sediment interface caused turbulence. Within less than a minute, the fuel capsule was completely buried beneath the sediment surface. When next observed one month later, the capsule was concretized in sedimentary material. The agglomeration was roughly spherical in shape, about 6 centimeters in diameter, and the surface of this formation was grainy in texture.

The source was recovered and examined an additional seven times over the following fifteen months. No significant change in size and shape was noted over this period although certain surface features had undergone modifications. For example, an incorporated sea shell, firmly embedded and partly protruding through the surface, was evident for the first ten months. At later times only a vestige of this structure remained. Further, on some occasions fissures and fine cracks appeared which were not observed later.

Alkali and alkaline earth metals, sulfate, and pH, as well as temperatures, were measured in the interstitial waters and the waters above the sediment during several of the recoveries. Temperatures at the surface of the undisturbed concretized source were 100±2° C. The measurement in the sediment at about 30 cm, distant from the concretized source was 18±2° C. Hot waters collected from next to the fuel source were found to be slightly enriched with the alkali metals and Mg. Enrichment in Ca and Sr was significant. The sulfate content and the pH of the hot and the unheated pore waters were found not to differ significantly.

After the fuel cell was recovered from the ocean-sediment environment it was placed for storage in the plastic-lined drum containing 20 centimeter thick layer of San Clemente Island sediment and filled with seawater. Observations that followed revealed post-in-situ changes. The diameter of the spherical deposit grew slightly and its surface developed a polished appearance. In addition, an irregularly shaped patch of white coating appeared over about one-third of the total surface area and a dark deposit appeared on still another section.

Two months later the capsule was removed from the plastic-lined drum and stored in a seawater-filled container prepared for shipment. The size, shape and shadings of the specimen were essentially unchanged, although the surface became rougher. A number of cracks, 2–3 milimeters wide, developed. An outer layer, about 6 milimeters thick, separated from the core of the concretion. This outer layer was transformed during storage in seawater from a firm to a more fragile, less indurated aggregate. The coarse surface of the underlying core consisted of cemented sedimentary particles. Several narrow cracks were observed. The core was partially removed by prying at incisions made with a hacksaw blade. With about one-half of the concretion removed, the fuel capsule was easily slipped from the remainder of the concretion, thus denoting non-adhesion between the surfaces. The freshly exposed Ir clad possessed an untarnished metallic luster. The inside surface of the core was smooth white and about 1–3 milimeters thick. The balance of the deposit was similar in appearance to the outer layer.

When the Ir clad was opened to remove the $PuO_2$ pellet a small quantity of white salt deposit was observed on the surface of the pellet. A cross-section through the vent assembly revealed deposited material between the sintered Ic disc and the cover. Electron microprobe analysis of several particles indicated that the major constituents in the particles were Al, and Si, and the minor components were Ca, Na and Mg. Their composition was consistent with that of local feldspathic sediment. The introduction of these foreign materials to the inner chamber containing the $PuO_2$ pellet was caused by the fact that the pellet originally was at a very high temperature that was quickly reduced when placed in the seawater. A reduction in pressure inside the container resulted, causing a small amount of seawater and local material to be sucked into the container. No visual evidence of corrosion of the interior of the iridium capsule was observed, nor was uniform or localized corrosion detectable in the Ir microstructure.

X ray diffraction and electron microprobe analysis revealed that the white matrix material in immediate contact with the outside of the fuel capsule was primarily anhydrite with minor inclusions of local feldspathic sediment. The cementing agent of the sedimentary particles in the concretized core was also identified as consisting primarily of anhydrite with smaller amounts of other, as yet, unidentified substances.

The above analysis has led to explanation of the process that seems to be occurring in the formation of the concretized layers. The hot $PuO_2$ capsule is rapidly cooled when it is immersed into the cold seawater. Concomitantly seawater is drawn through the vent hole into the small space between the fuel pellet and the Ir clad. Sedimentary particles small enough to pass through the vent hole (less than 0.5 milimeters diameter) were restrained from entry into the main body of the capsule by the sintered disc. The capsule meanwhile penetrated and rapidly settled into the sediment. In this medium with a porosity of 35 percent, the removal of heat from the source was reduced. As the temperature of the source and the surrounding environment rose, the boiling point, 124° C. at a depth of 25 meters, was attained.

Hot pore water leached the alkali and alkaline earth metals, especially Ca and Sr from the sediment and precipitated anhydrite around the outer surface of the capsule. The solubility of anhydrite is inversely related to temperature. Anhydrite begins to precipitate from the heated seawater between about 110° and 120° C. at 3.5 atm, the pressure which occurred at the in-situ depth. Initially, pore water percolated freely through the sediment adjacent to the fuel cell and a 1–3 milimeter thick layer of nearly pure anhydrite precipitated onto the surface of the fuel capsule. Beyond this thickness anhydrite and other substances precipitated and cemented sedimentary particles to form a well indurated impermeable spherical body. Since the surface area of the concretion was larger than that of the heat source, the heat flux and the temperature at the surface decreased. At a diameter of 6 cm. the temperature at the surface of the concretion was insufficient to promote additional anhydrite precipitation.

When the concretized source was removed from the ocean environment and transferred to a plastic-lined drum for storage, the maximum temperature at the surface of the concretion was 100.6° C., the temperature of boiling seawater at 1 atmosphere. At this lower temperature anhydrite would not be expected to precipitate. Thus, the small visually detectable incremental deposit was probably cemented by another unidentified phase. The white and dark patches visible on the surface of the concretion after storage were also not characterized.

When the concretized fuel cell was stored in a shipping container filled only with seawater, the temperature of the seawater rose to 52° C. and stabilized. At that temperature transformation of anhydrite to gypsum would be anticipated. This process extended inward to a depth of 6 milimeters and resulted in detachment of the outer layer of the concretion.

The entire process can essentially be summarized as follows. The Ir-clad $^{238}$PuO$_2$ fuel capsule when buried in coastal sediment developed a concretion as a result of thermally driven reactions between the sediment and the pore water. The porosity of this barrier was low enough to prevent the corrosion of the Ir container, which would otherwise have occurred in seawater had the sediment been absent. The concretized barrier then formed a protective layer about the heat producing capsule to prevent destructive corrosion by the seawater as well as containing the heat producing material within its capsule.

It is clear that any heat producing material contained in a similar canister or capsule which generates temperatures to the point at which anhydrite precipitates out would also produce a similar result of causing concretized materials to form about the holding canister.

While the studies and results reported above apply to a fuel cell of size approximately 3 centimeters in diameter, it is to be understood and expected that scaling to larger canisters containing heat developing radioactive or other materials would likewise cause the process reported above to occur on outer surfaces. Thusly, such other size containers would be expected to form anhydrite and cementized layers about them which would serve as protective barriers against the corroding effects of the seawater.

Obviously, many modifications and variations of the present invention are possible in the light of the above teachings. It is therefore to be understood that within the scope of the appended claims the invention may be practiced otherwise than as specifically described.

I claim:

1. A method of forming a concretized coating which encapsulates a canister of heat producing materials and provides protection against corrosion by seawater when said canister is placed in an ocean floor-sediment environment, said method comprising the steps:

selecting a location on the ocean floor at such a depth that the proximate seawater thereat would be capable of reaching a temperature of at least 110° C. when in contact with the canister of heat producing materials and wherein seawater within the pores of the ocean floor sediment thereat contains sufficient amounts of calcium and sulfate to form, at said temperature, an anhydrite layer around the canister;

placing said canister into the ocean floor sediment at said location; and storing said canister at said location for at least one month thereby allowing heat from said canister to raise the temperature of the seawater in the pores of the sediment proximate to said canister to at least 110° C. wherein anhydrite precipitates from the proximate seawater and forms a concretized layer on the exterior surfaces of said canister.

* * * * *